United States Patent
Tsukada et al.

(10) Patent No.: US 10,029,675 B2
(45) Date of Patent: Jul. 24, 2018

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Yuta Tsukada, Shizuoka-ken (JP); Yu Miyahara, Susono (JP); Akihiro Fujimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/455,899

(22) Filed: Mar. 10, 2017

(65) Prior Publication Data

US 2017/0291596 A1 Oct. 12, 2017

(30) Foreign Application Priority Data

Apr. 12, 2016 (JP) .................................. 2016-079847

(51) Int. Cl.
*B60W 20/40* (2016.01)
*B60L 11/14* (2006.01)
(Continued)

(52) U.S. Cl.
CPC .............. *B60W 20/40* (2013.01); *B60L 11/14* (2013.01); *F02B 75/18* (2013.01); *F02D 41/042* (2013.01);
(Continued)

(58) Field of Classification Search
CPC ........... B60W 20/40; B60W 2710/083; B60W 2510/0685; B60W 2710/06; B60L 11/14;
(Continued)

(56) References Cited

U.S. PATENT DOCUMENTS

| 5,725,456 A * | 3/1998 | Fischer | F16D 48/066 477/169 |
| 7,607,499 B2 * | 10/2009 | Egami | B60K 6/365 180/65.21 |

(Continued)

FOREIGN PATENT DOCUMENTS

| JP | 2011-219019 A | 11/2011 |
| JP | 2016-147625 A | 8/2016 |
| WO | 2014/162471 A1 | 10/2014 |

*Primary Examiner* — Frederick M Brushaber
(74) *Attorney, Agent, or Firm* — Hunton Andrews Kurth LLP

(57) ABSTRACT

A control device for a hybrid vehicle is, in the process of stopping an internal combustion engine of the vehicle, capable of making twist angle fluctuation reduction control and crank angle position control mutually compatible. When a request for stopping the internal combustion engine has been issued, twist angle fluctuation reduction control is implemented without implementing crank angle position control, until, in the process of bringing the engine to a stopped state, the rotational speed of the internal combustion engine drops below the resonant rotational speed region of the torsional damper; and, after the rotational speed of the internal combustion engine has dropped below the resonant rotational speed region of the torsional damper in the process of bringing the engine to a stopped state, crank angle position control is implemented without implementing twist angle fluctuation reduction control, until stopping of the internal combustion engine has been completed.

3 Claims, 7 Drawing Sheets

(51) Int. Cl.
*F02B 75/18* (2006.01)
*F02D 41/04* (2006.01)

(52) U.S. Cl.
CPC ..... *B60L 2240/423* (2013.01); *B60L 2240/44* (2013.01); *B60W 2510/0685* (2013.01); *B60W 2710/06* (2013.01); *B60W 2710/083* (2013.01); *B60Y 2300/60* (2013.01); *F02B 2075/1808* (2013.01); *F02B 2075/1816* (2013.01); *Y10S 903/902* (2013.01)

(58) Field of Classification Search
CPC ............ B60L 2240/44; B60L 2240/423; F02B 75/18; F02B 2075/1808; F02B 2075/1816; F02D 41/042; Y10S 903/902; B60Y 2300/60
See application file for complete search history.

(56) References Cited

U.S. PATENT DOCUMENTS

| | | | | |
|---|---|---|---|---|
| 7,809,493 B2* | 10/2010 | Adachi | ................ | F02D 41/009 701/112 |
| 8,226,525 B2* | 7/2012 | Swales | ................ | B60W 10/08 123/179.4 |
| 8,239,121 B2* | 8/2012 | Hattori | ................ | B60K 6/365 123/179.3 |
| 8,506,448 B2* | 8/2013 | Hokoi | ................ | B60K 6/445 477/3 |
| 8,554,451 B2* | 10/2013 | Tsuji | ................ | F02D 41/0005 123/179.4 |
| 8,598,826 B2* | 12/2013 | Danjo | ................ | B60L 3/003 318/400.02 |
| 8,662,228 B2* | 3/2014 | Hill | ................ | B62K 5/027 180/210 |
| 8,676,478 B2* | 3/2014 | Nakai | ................ | B60W 10/06 123/179.4 |
| 8,731,765 B2* | 5/2014 | Wang | ................ | B60W 50/0205 318/490 |
| 9,581,122 B2* | 2/2017 | Tsukada | ................ | B60W 20/40 |
| 2004/0255904 A1* | 12/2004 | Izawa | ................ | B60K 6/445 123/352 |
| 2007/0249461 A1* | 10/2007 | Tsuji | ................ | B60K 1/02 477/3 |
| 2012/0059544 A1* | 3/2012 | Kinoshita | ................ | B60G 17/0164 701/22 |
| 2016/0017856 A1* | 1/2016 | Tsukada | ................ | B60W 20/40 701/112 |
| 2017/0282890 A1* | 10/2017 | Fujimoto | ................ | B60K 6/445 |

* cited by examiner

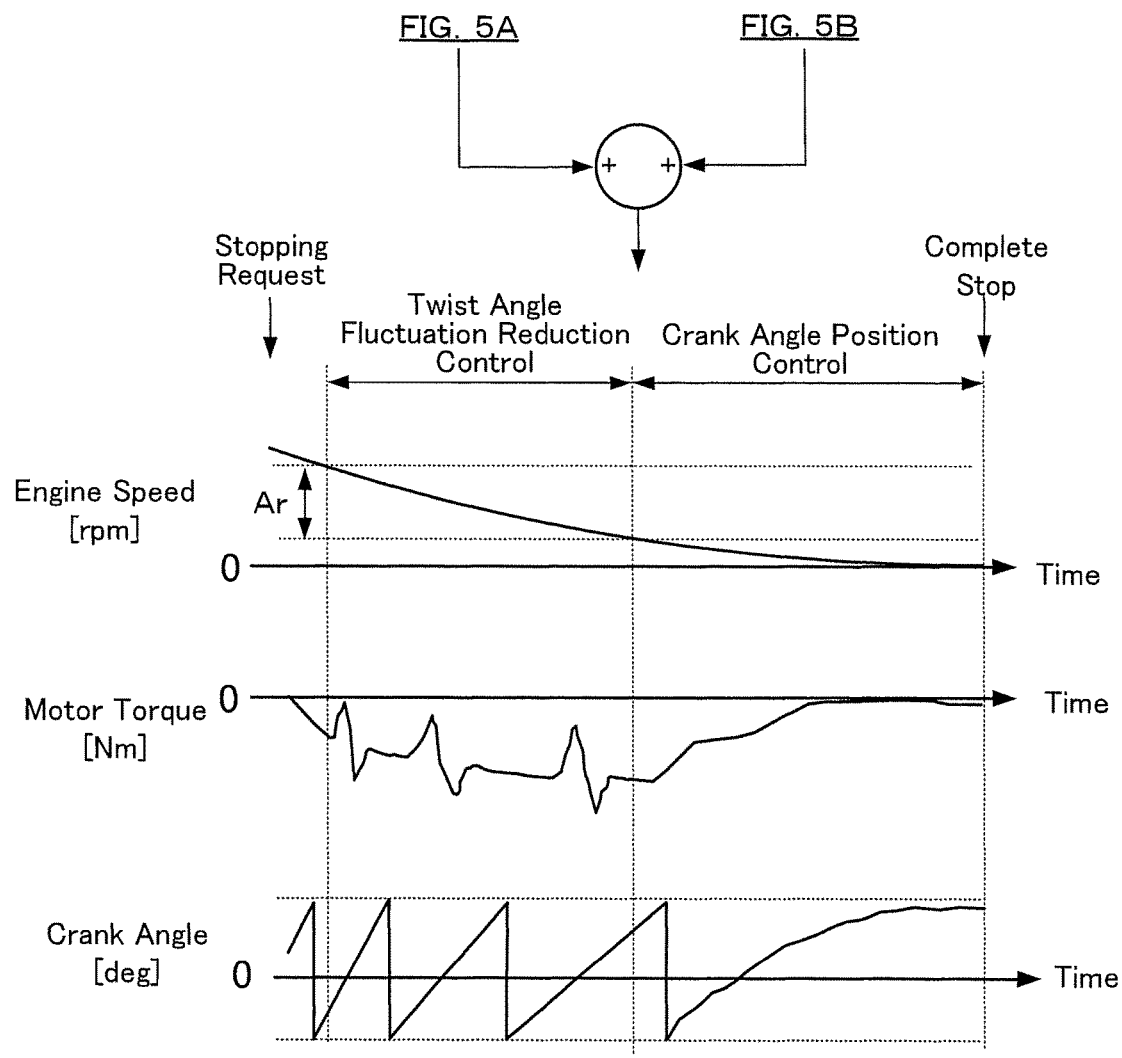

CONTROL DEVICE FOR HYBRID VEHICLE

TECHNICAL FIELD

The present invention relates to a control device for a hybrid vehicle, that is applied to a hybrid vehicle comprising both an internal combustion engine and also a motor-generator.

BACKGROUND ART

As a control device for a hybrid vehicle, for example, a device is per se known that, during stopping of an internal combustion engine of the vehicle, implements twist angle fluctuation reduction control in which amplification of twist angle fluctuations is suppressed by appropriately operating a motor-generator of the vehicle so that damping torque generated by the restoring force due to twisting of a torsional damper operates in the direction to cancel torque pulsations of the internal combustion engine during the stopping process (refer to Patent Document #1). Moreover, in some cases, in order to suppress vibration upon restarting of the internal combustion engine after it has been stopped, crank angle position control is performed in which, by appropriately operating the motor-generator, the crank angle is feedback controlled so that the internal combustion engine stops at a predetermined crank angle (for example, refer to Patent Document #2).

CITATION LIST

Patent Literature

Patent Document #1: International Publication WO 2014/162471.
Patent Document #2: Japanese Patent Publication 2011-219019 A.

SUMMARY OF INVENTION

Technical Problem

Both the above described twist angle fluctuation reduction control and also the above described crank angle position control that are implemented during the process of stopping the internal combustion engine involve operation of the motor-generator. Due to this, if these two types of control are implemented at the same time during the process of stopping the internal combustion engine, then there is a possibility that these two types of control cannot be mutually compatible, because the motor torque outputted from the motor-generator will not be properly appropriate for the objective of either of these types of control.

Accordingly the object of the present invention is to provide a control device for a hybrid vehicle that, in the process of stopping an internal combustion engine of the vehicle, is capable of making the twist angle fluctuation reduction control and the crank angle position control be mutually compatible.

Solution to Technical Problem

A control device as one aspect of the present invention is a control device for a hybrid vehicle, the control device being applied to the hybrid vehicle comprising an internal combustion engine and a motor-generator, wherein engine torque of the internal combustion engine is transmitted to a transmission path via a torsional damper, and motor torque of the motor-generator is transmitted to the transmission path, wherein the control device is, by implementing a computer program, allowed: to implement twist angle fluctuation reduction control that, when a stopping request for stopping the internal combustion engine has been issued, fluctuations of the torsional angle of the torsional damper are reduced by controlling the motor-generator during a process of bringing the internal combustion engine to a stopped state, and also to implement crank angle position control that, when the stopping request for stopping the internal combustion engine has been issued, the crank angle of the internal combustion engine is feedback controlled by operating the motor-generator during a process of bringing the internal combustion engine to a stopped state, wherein the control device is, by implementing the computer program, configured: to implement, when the stopping request for stopping the internal combustion engine has been issued, the twist angle fluctuation reduction control without implementing the crank angle position control, until, in the process of bringing the engine to the stopped state, a rotational speed of the internal combustion engine gets out of a resonant rotational speed region of the torsional damper; and to implement, after the rotational speed of the internal combustion engine has got out of the resonant rotational speed region of the torsional damper in the process of bringing the engine to the stopped state, the crank angle position control without implementing the twist angle fluctuation reduction control, until the stopping of the internal combustion engine has been completed.

According to this control device, in the process of bringing the internal combustion engine to the stopped state, a changeover is made between implementation of the twist angle fluctuation reduction control and implementation of the crank angle position control when the rotational speed of the internal combustion engine gets out of (i.e. drops below) the resonant rotational speed region. Accordingly, the problem is avoided of implementing these two controls at the same time. Thereby, it is possible to make the motor-generator output motor torques directed for these two controls respectively. Therefore, in the processing of stopping the internal combustion engine, it is possible for both of these controls to be made to be compatible, accordingly Any type of twist angle fluctuation reduction control will be acceptable, provided that it is capable of reducing fluctuations of the twist angle of the torsional damper. For example, an internal combustion engine having four or fewer cylinders may be provided as the internal combustion engine; and the control device may be configured to implement, as the twist angle fluctuation reduction control, a first type of control to operate the motor-generator so that the motor torque is outputted having a same cycle as torque pulsations of the engine torque of the internal combustion engine, and out of phase with the torque pulsations by 180°. According to this embodiment of the present invention, due to the implementation of the first type of control, motor torque having the same cycle as the torque pulsations of the engine torque of the internal combustion engine and out of phase with the torque pulsations by 180° is outputted from the motor-generator. Thereby, in appearance, the frequency of the torque inputted to the torsional damper is changed so that the frequency of the torque inputted to the torsional damper is increased, accordingly it is possible to avoid resonance of the torsional damper. Thus, it is possible to reduce fluctuations of the twist angle of the torsional damper.

Moreover, the control device may be configured to implement, as the twist angle fluctuation reduction control, a second type of control to operate the motor-generator so that damping torque generated by a restoring force due to twisting of the torsional damper operates in a direction to cancel torque pulsations of the engine torque of the internal combustion engine. According to this embodiment, since the damping torque operates in the direction to cancel the torque pulsations of the engine torque, accordingly it is possible to suppress the amplitude of the combined torque that results from combination of the damping torque and the engine torque, so that it is possible to reduce fluctuations of the twist angle of the torsional damper.

BRIEF DESCRIPTION OF DRAWINGS

FIG. 5C is a diagram showing control contents according to one embodiment of the present invention.

DESCRIPTION OF EMBODIMENTS

Embodiment #1

Figure 1:
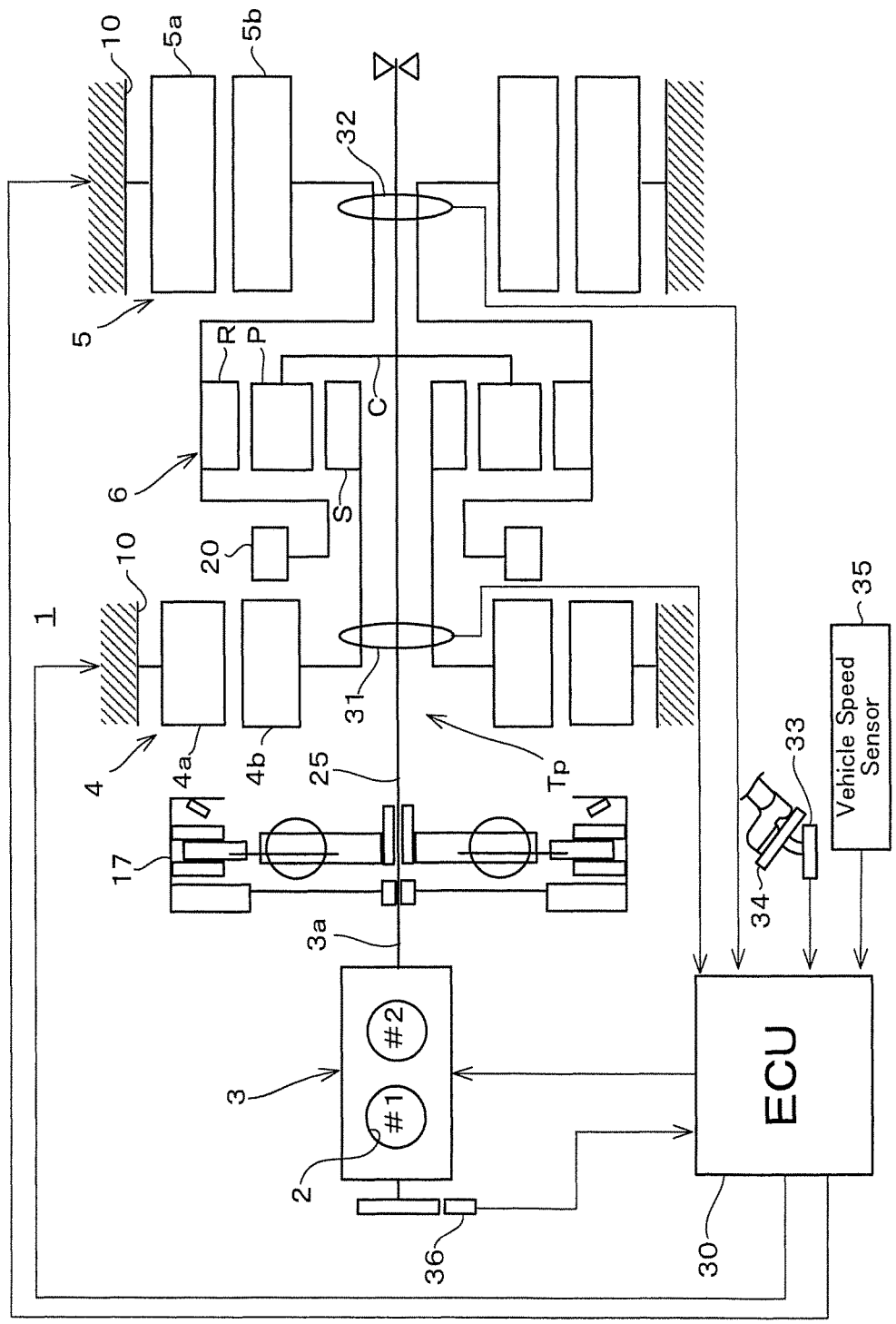
FIG. 1 is a diagram showing the overall structure of a hybrid vehicle to which a control device as one aspect of the present invention is applied.

As shown in FIG. 1, a vehicle 1 is built as a hybrid vehicle in which a plurality of power sources are combined. As power sources for propulsion, this vehicle 1 comprises an internal combustion engine 3 and two motor-generators 4 and 5. The internal combustion engine 3 is built as a spark ignition two-cylinder in-line type internal combustion engine having two cylinders 2. Since this internal combustion engine 3 is a four stroke single cycle type engine having two cylinders, accordingly the ignition interval between the two cylinders 2 is set to 360°.

The internal combustion engine 3 and the first motor-generator 4 are linked to a power splitting mechanism 6 that is provided to a transmission path Tp. The first motor-generator 4 has a stator 4a and a rotor 4b. The stator 4a is fixed to a casing 10. The first motor-generator 4 can function either as an electric generator that receives rotational power from the internal combustion engine 3 split off by the power splitting mechanism 3 and generates electricity, or as an electric motor that is driven by AC electrical power. In a similar manner, the second motor-generator 5 has a stator 5a that is fixed to the casing 10 and a rotor 5b, and can function either as an electric motor or as an electric generator. The first motor-generator 4 corresponds to the "motor-generator" of the present invention.

The power splitting mechanism 6 is built as a single pinion type planetary gear mechanism. This power splitting mechanism 6 comprises a sun gear S which is an externally toothed gear wheel, a ring gear R which is disposed coaxially with the sun gear S and is an internally toothed gear wheel, and a planet carrier C that supports a pinion P that is meshed with these gears S and R so that it can rotate as well as revolve. The engine torque outputted by the internal combustion engine 3 is transmitted via a torsional damper 17 to the planet carrier C of the power splitting mechanism 6 that is provided to the transmission path Tp.

The rotor 4b of the first motor-generator 4 is linked to the sun gear S of the power splitting mechanism 6. And torque outputted from the power splitting mechanism 6 via the ring gear R is transmitted to an output gear 20. Moreover, torque outputted from the output gear 20 is transmitted to drive wheels not shown in the figures via a transmission mechanism of some type.

Control of the various sections of the vehicle 1 is performed by an electronic control device (i.e. an ECU) 30, which is built as a computer. This ECU 30 performs various kinds of control for the internal combustion engine 3 and the motor generators 4 and 5. And information of various types related to the vehicle 1 is inputted to the ECU 30. For example, the output signal of a first resolver 31 that outputs a signal corresponding to the rotational angle of the first motor-generator 4, the output signal of a second resolver 32 that outputs a signal corresponding to the rotational angle of the second motor-generator 5, the output signal of an accelerator opening degree sensor 33 that outputs a signal corresponding to the amount that an accelerator pedal 34 has been stepped upon, the output signal of a vehicle speed sensor 35 that outputs a signal corresponding to the speed of the vehicle 1, and the output signal of a crank angle sensor 36 that outputs a signal corresponding to the crank angle of the internal combustion engine 3, are inputted to the ECU 30.

The ECU 30 calculates a requested drive force being requested by the driver of the vehicle 1 by referring to the output signal of the accelerator opening degree sensor 33 and to the output signal of the vehicle speed sensor 35, and performs control of the vehicle 1 while changing over between various modes, so as to keep the system efficiency at an optimum for this requested drive force. For example, in a low load region in which the thermal efficiency of the internal combustion engine 3 decreases, an EV mode is selected in which combustion operation by the internal combustion engine 3 is stopped and the second motor-generator 5 is driven. Moreover, if there would be a shortage of torque if only the internal combustion engine 3 were to be used, then a hybrid mode is selected in which, as well as the internal combustion engine 3 being employed, the second motor-generator 5 is also employed as the source of power for propulsion.

Twist Angle Fluctuation Reduction Control

In order to suppress noise during the process of stopping the internal combustion engine 3, the ECU 30, in the process of bringing the internal combustion engine 3 to a stopped state, implements twist angle fluctuation reduction control in which fluctuations of the twist angle of the torsional damper 17 are reduced by controlling the first motor-generator 4. In this embodiment, as this twist angle fluctuation reduction control, a first type of control is implemented that avoids resonance of the torsional damper 17. In this first type of control, the first motor-generator 4 is operated so as to output a motor torque having the same cycle as the torque pulsations of the engine torque of the internal combustion engine 3, but out of phase with the torque pulsations by 180°.

Figure 2:
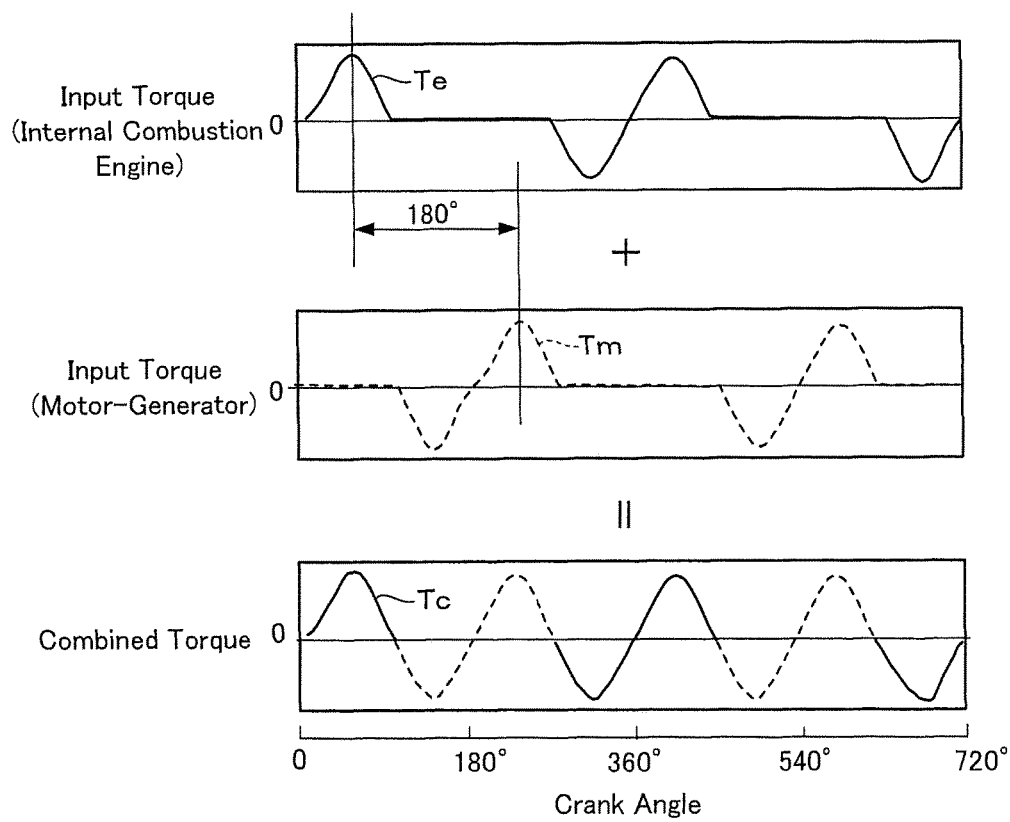
FIG. 2 is a diagram showing control contents of twist angle fluctuation reduction control.
Figure 3:
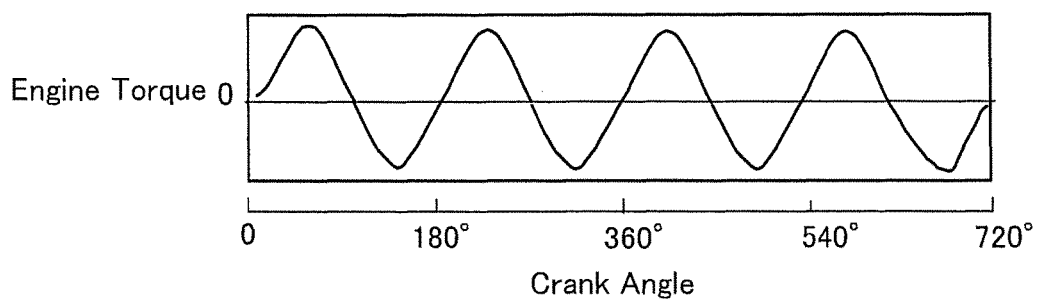
FIG. 3 is a diagram showing each stroke of a four-cylinder type internal combustion engine and the engine torque.

Now, fundamental matters related to this first type of control, which is an example of twist angle fluctuation reduction control, will be explained with reference to FIGS. 2 and 3. In FIG. 2, there are shown the strokes of the two cylinders 2 (#1 and #2)[1] of the internal combustion engine 3, and the changes according to crank angle over a single engine cycle of the input torque that is inputted from the internal combustion engine 3 to the torsional damper 17, of the input torque that is inputted from the first motor-generator 4 to the torsional damper 17, and of a combined torque that is obtained by combination of these two input torques. It should be understood that the torque waveforms in FIGS. 2 and 3 are shown schematically, with the details of the torque fluctuations of the actual engine and irregularities in the torque of each cylinder and so on having been abstracted away.

As shown in FIG. 2, the strokes of the cylinders 2 of the internal combustion engine 3 are as shown in the figure, and the ignition interval between the #1 cylinder and the #2 cylinder is 360° of crank angle. The input torque inputted from the internal combustion engine 3 to the torsional damper 17 changes as shown in the figure according to a discontinuous torque waveform Te which has a positive peak in the expansion stroke of each of the cylinders 2 and a negative peak in the compression stroke of each of the cylinders 2, with the input torque between these peaks becoming zero. This waveform Te corresponds to the torque pulsations of the engine torque outputted by the internal combustion engine 3.

On the other hand, in this first type of control, a motor torque is outputted from the first motor-generator 4 having the same cycle as the torque pulsations of the engine torque but out of phase with the torque pulsations by 180°. Due to this, the input torque that is inputted from the first motor-generator 4 to the torsional damper 17 becomes the waveform Tm as shown in the figure, whose phase differs from that of the waveform Te by 180°.

The waveform Tc that results from combining the waveform Te and the waveform Tm thus becomes continuous, with the frequency of the torque inputted to the torsional damper 17 being increased as compared to the case in which only the engine torque of the internal combustion engine 3 is inputted thereto. In other words, in appearance, this waveform Tc becomes equivalent to the engine torque waveform of a four cylinder internal combustion engine as shown in FIG. 3.

Figure 4:
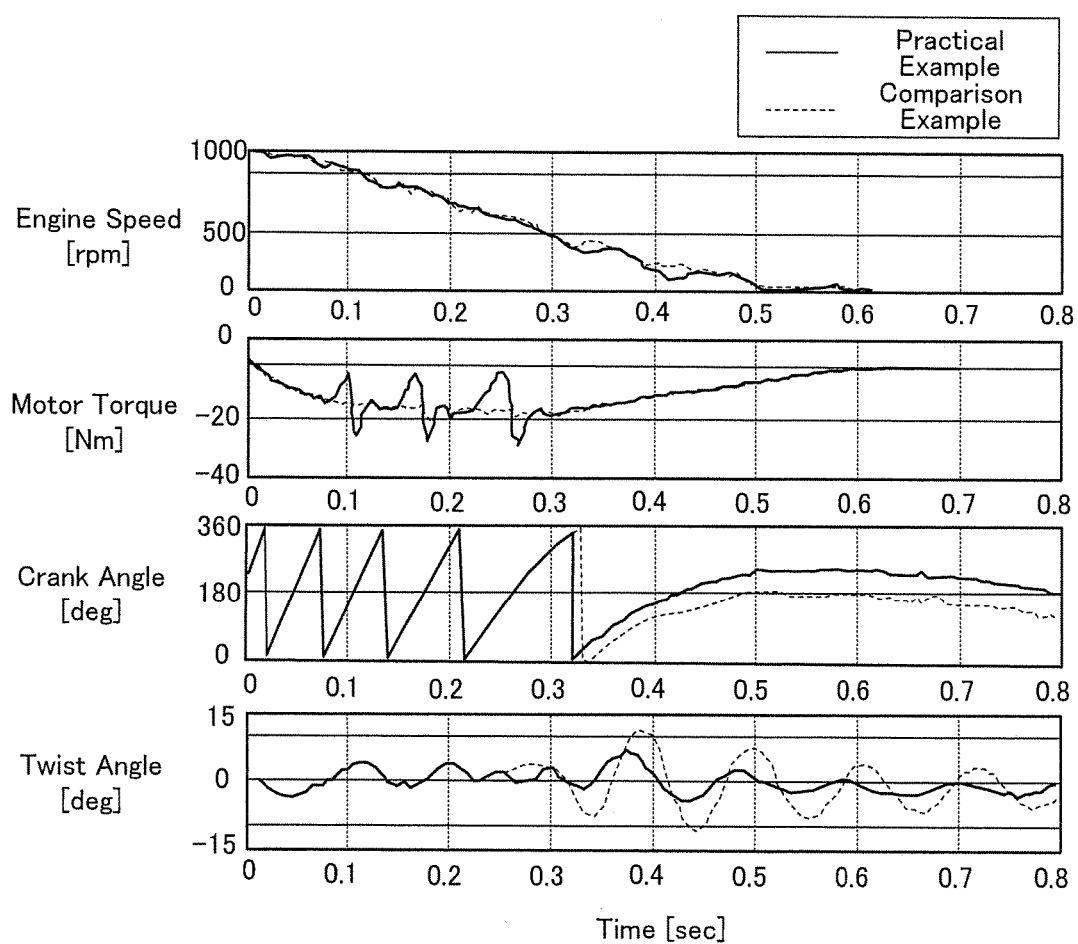
FIG. 4 is a timing chart showing results of simulation.

In the case of this embodiment, although, at some predetermined engine speed during the process of stopping the internal combustion engine 3, the frequency of the engine torque passes through the resonant point of the torsional damper 17, nevertheless it has become possible to avoid this resonant point of the torsional damper 17 by increasing the frequency of the input torque that is inputted to the torsional damper 17 by implementing the first type of control shown in FIG. 2. Due to this, it is possible to avoid resonance of the torsional damper 17 during the process of stopping the internal combustion engine 3. And, due to this, as shown by the solid lines in FIG. 4, it is possible to suppress increase of the twist angle of the torsional damper 17 directly before the internal combustion engine 3 stops, as compared to the case with a comparison example in which the control of this embodiment is not implemented, as shown by the broken lines.

Crank Angle Position Control

Furthermore, in order to suppress the occurrence of vibration when the internal combustion engine 3 is being restarted after having been stopped, the ECU 30 implements crank angle position control by operating the first motor-generator 4 so that the crank angle when the internal combustion engine 3 has reached the stopped state becomes equal to a predetermined crank angle. If a request for stopping the internal combustion engine 3 has been issued, in this crank angle position control, in the process of bringing the internal combustion engine 3 to the stopped state, the crank angle of the internal combustion engine 3 is feedback controlled by operating the first motor-generator 4. In more concrete terms, in the process of bringing the internal combustion engine 3 to the stopped state, the ECU 30 calculates a control amount by multiplying the deviation between the value measured by the crank angle sensor 36 and a target value for crank angle that has been set in advance by a control gain, and controls the crank angle at each stage of bringing the engine 3 to the stopped state by commanding this control amount to the first motor-generator 4, so as to bring the crank angle to coincide with the target value.

Figures 5A, 5B:
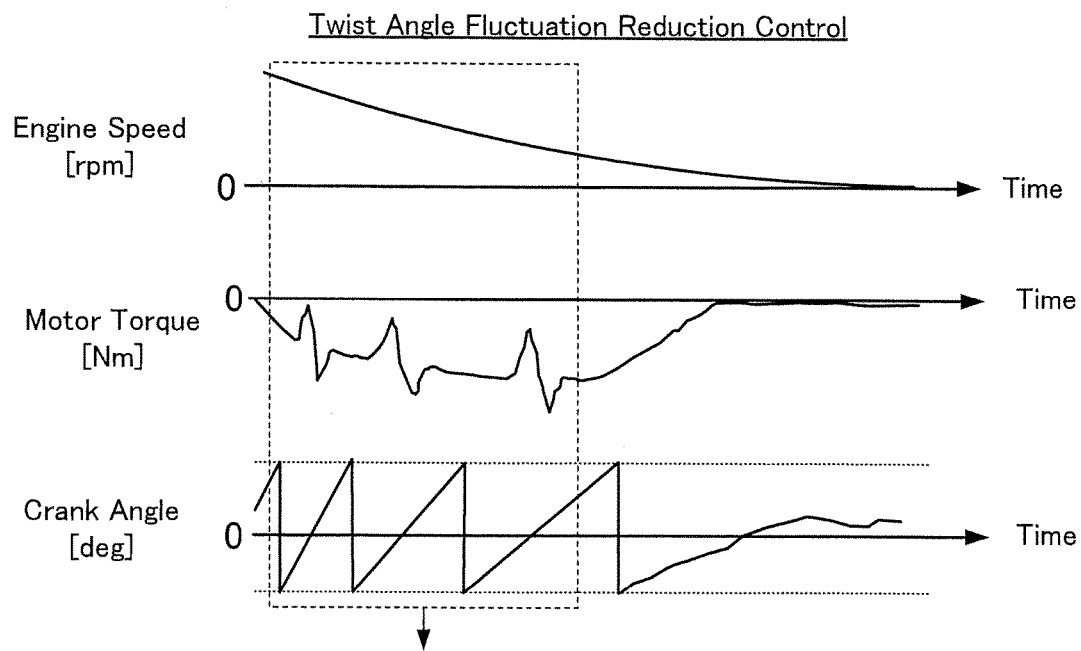
FIG. 5A is a diagram showing the change over time of various parameters when only twist angle fluctuation reduction control is implemented until the internal combustion engine is brought to a stopped state.
FIG. 5B is a diagram showing the change over time of various parameters when only crank angle position control is implemented until the internal combustion engine is brought to a stopped state.

This embodiment is distinguished by the control contents performed while implementing the twist angle fluctuation reduction control and the crank angle position control described above during the process of stopping the internal combustion engine 3. FIGS. 5A and 5B show changes over time, until the internal combustion engine 3 is brought to the stopped state, of the crank angle, the motor torque of the first motor-generator 4, and the engine speed. FIG. 5A shows a case in which only the twist angle fluctuation reduction control is implemented until the internal combustion engine 3 is brought to the stopped state, and FIG. 5B shows a case in which only the crank angle position control is implemented until the internal combustion engine 3 is brought to the stopped state. With the control of this embodiment, after a request for stopping the internal combustion engine 3 has been issued, in the process of bringing the engine 3 to the stopped state, a changeover is made between implementation of the twist angle fluctuation reduction control and implementation of the crank angle position control after that time point at the moment as a trigger when the rotational speed Ne of the internal combustion engine 3 gets out of the resonant rotational speed region Ar. In other words, the twist angle fluctuation reduction control as shown in FIG. 5A is implemented without implementing the crank angle position control, until before the rotational speed Ne of the internal combustion engine 3 gets out of (i.e. drops below) the resonant rotational speed region Ar; while, after the rotational speed Ne of the internal combustion engine 3 has got out of (i.e. has dropped below) the resonant rotational speed region Ar, the crank angle position control is implemented without implementing the twist angle fluctuation reduction control, until the internal combustion engine 3 comes to a complete stop.

By doing this, it is possible to avoid implementing both the twist angle fluctuation reduction control and the crank angle position control at the same time. Since thereby it is possible to output from the first motor-generator 4, motor torque values that are individually directed at each of these controls, accordingly, during the process of stopping the internal combustion engine 3, it is possible to make both these two controls be mutually compatible. As a result, while being able to suppress the generation of noise by suppressing fluctuations of the twist angle of the torsional damper 17, it is also possible to control the crank angle of the internal combustion engine 3, when it has finally been brought to the stopped state, to be equal to a predetermined crank angle.

Figure 6:
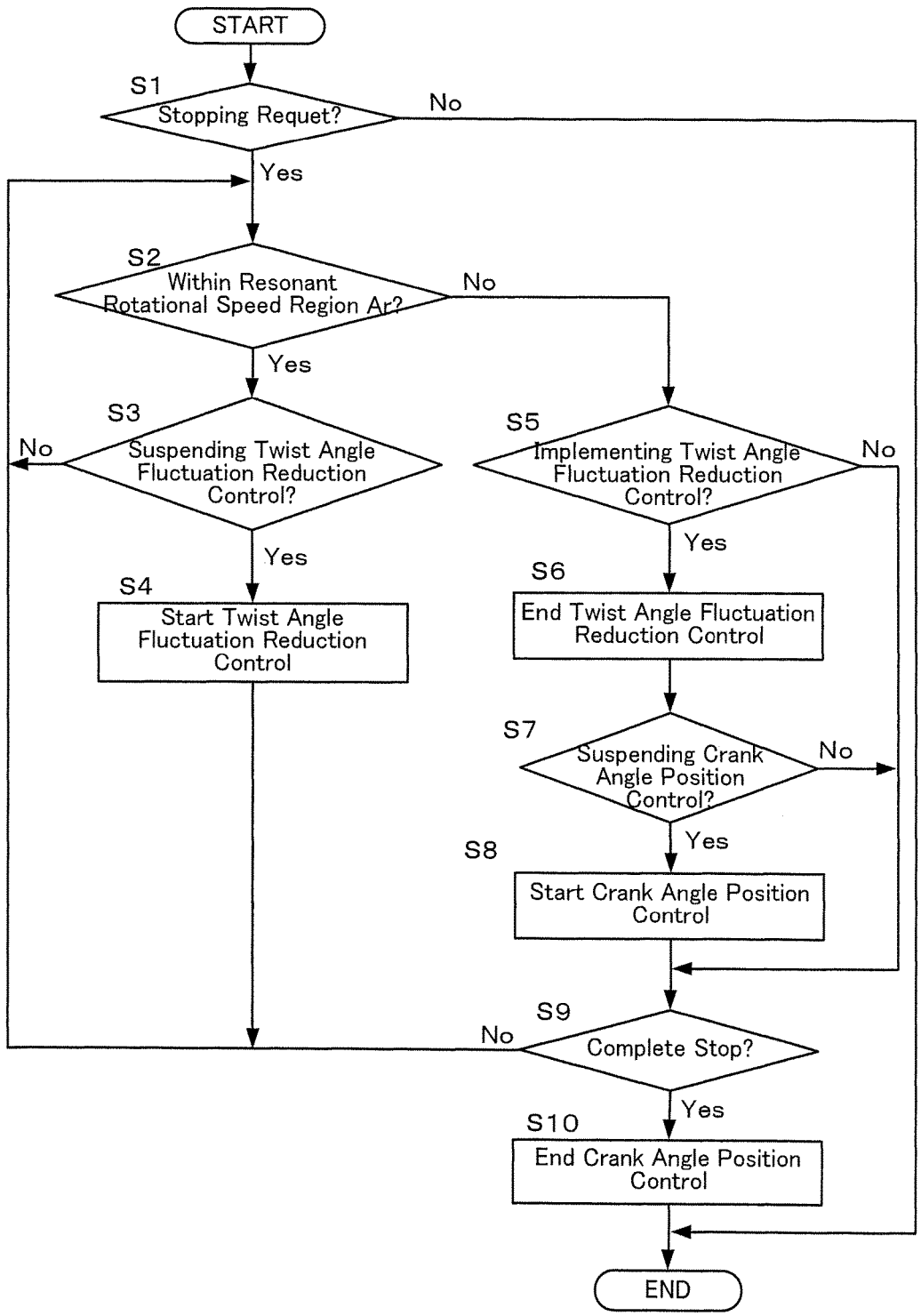
FIG. 6 is a flow chart showing an example of a control routine according to one embodiment of the present invention.

The ECU 30 implements the control described above by executing a control routine shown in FIG. 6. A program for the control routine of FIG. 6 is stored in advance in the ECU 30, and is read out in a timely manner and is executed repeatedly at predetermined intervals.

In a step S1, the ECU 30 determines whether or not a stopping request for stopping the internal combustion engine 3 has been issued. Such a stopping request is issued when a predetermined condition for bringing the vehicle 1 to rest, or for changing over the vehicle 1 from the hybrid mode to the EV mode, or the like becomes valid. If the stopping request has been issued then the ECU 30 makes the control proceed to a step S2, while if no such stopping request has been issued then the following processing is skipped and the ECU 30 terminates this iteration of the routine. It should be understood that, if the stopping request has been issued, then, in parallel with the routine of FIG. 6 being implemented, the ECU 30 also starts stopping control that includes cutting off the supply of fuel, according to a routine not shown in the figures.

In the step S2, the ECU 30 makes a decision as to whether or not the rotational speed of the internal combustion engine 3 is within a resonant rotational speed region Ar. If the rotational speed of the internal combustion engine 3 is within the resonant rotational speed region Ar, then the ECU 30 makes the control proceed to a step S3, while if it is not then the ECU 30 makes the control proceed to a step S5.

In the step S3, the ECU 30 makes a decision as to whether or not the present situation is previous to the starting of twist angle fluctuation reduction control, in other words, a decision as to whether or not the twist angle fluctuation reduction control is currently suspended. If the twist angle fluctuation reduction control is currently suspended, then the ECU 30 makes the control proceed to a step S4, while if it is not then the ECU 30 makes the control return to the step S2. In the step S4, the ECU 30 starts the twist angle fluctuation reduction control, and then makes the control return to the step S2. Due to this, the twist angle fluctuation reduction control is implemented until, in the process of bringing the internal combustion engine 3 to a stop state, its rotational speed gets out of (drops below) the resonant rotational speed region Ar.

In the step S5, the ECU 30 makes a decision as to whether or not the twist angle fluctuation reduction control is currently being implemented. If the twist angle fluctuation reduction control is currently being implemented, then the ECU 30 makes the control proceed to a step S6 to end the twist angle fluctuation control. On the other hand if the twist angle fluctuation reduction control is not currently being implemented, then by skipping the processing of the steps S6 through S8, the ECU 30 makes the control proceed to a step S9.

In the next step S7, the ECU 30 makes a decision as to whether or not the crank angle position control is currently suspended. If the crank angle position control is currently suspended, then the ECU 30 makes the control proceed to the step S8 to start the crank angle position control. On the other hand if the crank angle position control is not currently suspended, then by skipping the processing of the step S8, the ECU 30 makes the control proceed to the step S9.

In the step S9, the ECU 30 makes a decision as to whether or not stopping of the internal combustion engine 3 has been completed. Whether or not stopping has been completed may, for example, be decided according to the condition that the rotational speed of the internal combustion engine 3 has become zero. If stopping of the internal combustion engine 3 has been completed, then the ECU 30 makes the control proceed to a step S10 to end the crank angle position control. Due to this, the crank angle position control is implemented in a period from after the time point that the engine speed gets out of (drops below) the resonant rotational speed region Ar until stopping of the internal combustion engine 3 is completed. But if stopping of the internal combustion engine 3 has not been completed, then the ECU 30 makes the control return to the step S2.

According to this embodiment, in the process of bringing the internal combustion engine 3 to a stopped state, it is avoided that both the twist angle fluctuation reduction control and the crank angle position control are implemented at the same time. Accordingly, it is possible to cause the motor torque outputted from the first motor-generator 4 to be appropriately directed at each of these controls. Since, due to this, in the processing of stopping the internal combustion engine 3, it is possible for both of these controls to be made to be compatible, accordingly, while suppressing generation of noise due to suppressing fluctuations of the twist angle of the torsional damper 17, it is also possible to control the crank angle of the internal combustion engine 3 which is being brought to a stopped state to become equal to a predetermined crank angle.

Embodiment #2

Next, a second embodiment of the present invention will be explained. This second embodiment is the same as the first embodiment, except for the fact that the control contents of the twist angle fluctuation reduction control are different. Accordingly, FIG. 1 should be referred to for the physical structure of the vehicle, and FIG. 6 should be referred to for control of the timings for implementation of the twist angle fluctuation reduction control and the crank angle position control.

In this second embodiment, as the twist angle fluctuation reduction control, a second type of control is implemented in which the first motor-generator 4 is operated so that the damping torque that is generated by the restoring force due to twisting of the torsional damper 17 operates in the direction to cancel the torque pulsations of the engine torque of the internal combustion engine 3. When the torsional damper 17 twists, due to the restoring force produced by this twisting, the damping torque is imparted to the crank shaft 3a of the internal combustion engine 3 (refer to FIG. 1). When the direction of this damping torque and the direction of a torque pulsation of the engine torque are the same, the fluctuation of the twist angle of the torsional damper 17 is amplified. Accordingly, the ECU 30 of this second embodiment suppresses amplification of the fluctuations of the twist angle of the torsional damper 17 by operating the first motor-generator 4 so that the damping torque operates in the direction to cancel the torque pulsations of the engine torque.

Also, in this second embodiment, the ECU 30 executes the control routine of FIG. 6, and thereby it is possible to avoid the twist angle fluctuation reduction control and the crank angle position control being implemented at the same time. Therefore, it is possible to output motor torque appropriately directed at each of these controls from the motor-generator 4. Accordingly, in a similar manner to the case with the first embodiment, both the twist angle fluctuation reduction control and the crank angle position control are made to be compatible with one another.

The present invention should not be considered as being limited to the embodiments described above; the present invention may be implemented in various different ways within the scope of its gist. The subject to which the present invention is applied is not limited to the hybrid vehicle of the type shown in FIG. 1. For example, the present invention could also be applied to a hybrid vehicle of a type in which a single motor-generator is directly coupled to an internal combustion engine via a torsional damper.

While, in the embodiments described above, the first type of control and the second type of control were shown by way of example as possibilities for the twist angle fluctuation reduction control. However, the twist angle fluctuation reduction control in the present invention is not limited to these types of control. It would also be acceptable to arrange to implement some type of control other than the first type of control or the second type of control described above as the twist angle fluctuation reduction control, provided that it is a type of control that is capable of reducing fluctuations of the torsional angle of the torsional damper.

While, in the embodiments described above, the subject was a hybrid vehicle equipped with an internal combustion engine which has two cylinders, the number of cylinders of the internal combustion engine should not be considered as being particularly limited. Naturally, for the embodiment that the first type of control is employed as the twist angle fluctuation reduction control, an internal combustion engine having four cylinders or fewer as the subject is desirable to be employed as the subject, and in particular, an internal combustion engine having two cylinders is the most desirable to be employed as the subject.

This application claims the benefit of foreign priority to Japanese Patent Application No. JP2016-079847, filed Apr. 12, 2016, which is incorporated by reference in its entirety.

The invention claimed is:

1. A control device for a hybrid vehicle, the control device being applied to the hybrid vehicle comprising an internal combustion engine and a motor-generator, wherein engine torque of the internal combustion engine is transmitted to a transmission path via a torsional damper, and motor torque of the motor-generator is transmitted to the transmission path, wherein when a stopping request for stopping the internal combustion engine has been issued, and during a process of bringing the internal combustion engine to a stopped state, the control device is, by implementing a computer program, configured to:

implement twist angle fluctuation reduction control that reduces fluctuations of the torsional angle of the torsional damper by controlling the motor-generator, and implement a crank angle position control wherein the crank angle of the internal combustion engine is feedback controlled by operating the motor-generator, wherein wherein the twist angle fluctuation reduction control is implemented without implementing the crank angle position control, until, in the process of bringing the engine to the stopped state, a rotational speed of the internal combustion engine gets out of a resonant rotational speed region of the torsional damper, and wherein after the rotational speed of the internal combustion engine has exited the resonant rotational speed region of the torsional damper in the process of bringing the engine to the stopped state, the crank angle position control is implemented without implementing the twist angle fluctuation reduction control, until the stopping of the internal combustion engine is complete.

2. The control device for the hybrid vehicle according to claim 1, wherein:

an internal combustion engine having four or fewer cylinders is provided as the internal combustion engine; and the control device is further configured to:

implement, as the twist angle fluctuation reduction control, a first type of control to operate the motor-generator so that the motor torque is outputted having a same cycle as torque pulsations of the engine torque of the internal combustion engine, and out of phase with the torque pulsations by 180°.

3. The control device for the hybrid vehicle according to claim 1 wherein, the control device is further configured to:

implement, as the twist angle fluctuation reduction control, a second type of control to operate the motor-generator so that damping torque generated by a restoring force due to twisting of the torsional damper operates in a direction to cancel torque pulsations of the engine torque of the internal combustion engine.

* * * * *